Sept. 29, 1964  R. CORTEZ  3,150,928
PROCESS FOR PREPARING METAL CHLORIDES
Filed Nov. 15, 1957
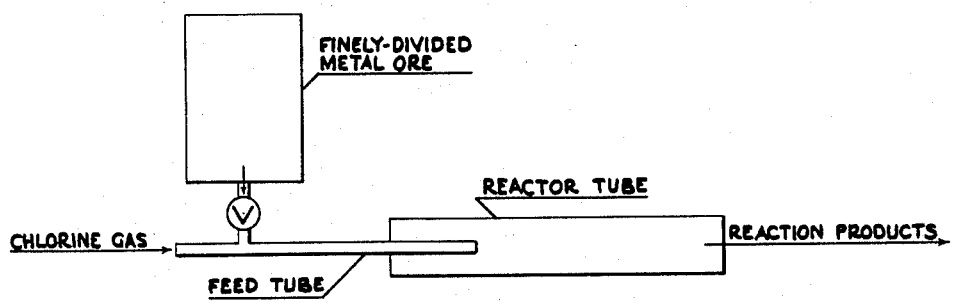
INVENTOR.
RICARDO CORTEZ
BY Oscar L. Spencer
ATTORNEY United States Patent Office 3,150,928
Patented Sept. 29, 1964

3,150,928
PROCESS FOR PREPARING METAL CHLORIDES
Ricardo Cortez, New Martinsville, W. Va., assignor, by mesne assignments, to Pittsburgh Plate Glass Company
Filed Nov. 15, 1957, Ser. No. 696,828
1 Claim. (Cl. 23—87)

The present invention relates to the chlorination of metal-bearing materials. More particularly, the instant discovery concerns a fast, efficient method of chlorinating finely-divided, metal-bearing materials, such as metal ores or derivatives thereof, without the necessity of complicated and cumbersome equipment and without the production of difficultly-separable reaction products.

It is known, for example, that titanium-bearing ores, such as rutile and ilmenite, may be chlorinated by several methods. For example, finely-ground rutile may be mixed with powdered coal and formed into briquets with the aid of a bonding material and subjected to a reduction roast in a furnace. Subsequently, dry chlorine may be passed through the reduced mass at elevated temperatures to chlorinate the metal oxide constituents of the mass.

Still another method of preparing titanium tetrachloride or the like involves admixing titanium-bearing ore particulates with a carbonaceous reducing agent, such as carbon, and forming a bed thereof. Chlorination is effected by passing chlorine gas upwardly through the bed. Metal chloride reaction products are taken off above the bed in a gaseous state and are subsequently condensed to effect separation thereof. The operation may be continuous or batch-wise.

It is obvious from these processes that expensive and cumbersome apparatus is required. Also, for instance, the step of briquetting does not enhance the economy of the operation. Furthermore, the chlorination of briquets generally requires the use of an amount of chlorine substantially greater than stoichiometric. This in itself is a drawback in view of the added cost.

The present invention, however, very efficiently and economically avoids the problems heretofore attending the chlorination of metal-bearing ores and the like. According to the present invention, a method of chlorinating a finely-divided, chlorinatable metal-bearing material is provided which comprises establishing a flame at a temperature between about 650° C. and 1300° C. and projecting into the flame a stream of gaseous chlorine having the metal-bearing material suspended therein. Chlorination of chlorinatable components of the metal-bearing material is effected in the flame and the resulting stream of reaction products containing metal chloride in a vapor state is withdrawn therefrom substantially as formed and without substantially diminishing the velocity of the stream. Essentially a uni-directional flow of the gas-solids suspension into the flame and of the reaction products withdrawn therefrom is effected, the flame itself essentially comprising the reaction zone for chlorinatable materials, the peripheral edges of said flame being generally spaced from the reactor walls.

In a particular embodiment, a stream of gaseous elemental chlorine is established containing suspended therein a metal-bearing material, such as a titanium-bearing ore, and a carbonaceous reducing agent, such as carbon, and the resulting suspension passed at a substantially constant velocity through a chlorinating flame. Instantaneously and essentially within the flame, chlorination of chlorinatable components of the metal-bearing material takes place and reaction products thus formed are withdrawn from the flame without significantly diminishing the velocity of the stream. With many chlorinatable metal-bearing ores the exothermic heat of chlorination is sufficient to maintain the flame at a temperature between about 650° C. and 1300° C.

Among the chlorinatable metal-bearing materials suitable for the present invention are the aforementioned titanium-bearing ores, such as rutile and ilmenite, relatively pure titanium dioxide, zirconium ores, zirconia, iron ores, chromium ores, and, preferably, titanium carbide, the latter requiring no carbonaceous reducing agent to effect chlorination.

The present invention will best be understood by reference to the following example, particularly in conjunction with FIGURE 1 of the drawing which is self-explanatory.

*Example I*

A horizontally-disposed three-foot Vycor (quartz sold by Corning Glass Works, Corning, N.Y.) reactor tube, open at both ends and having a two-inch internal diameter and a wall thickness of about 2.5 millimeters, was heated by external means to about 700° C. using electrical energy. The reactor was insulated using about a 2-inch (thickness) asbestos sheet. Penetrating to a depth of about 2 inches into one end of the three-foot Vycor tube was one end of another Vycor tube having an internal diameter of about 7 millimeters.

A gaseous suspension of titanium carbide solids [1] in chlorine gas, over 90 percent by weight of the solids having a 200 mesh size, was fed into the 70° C. Vycor tube from the smaller tube penetrating one end thereof. The titanium carbide solids had the following analysis, the amounts being given in percent by weight.

Elemental:
Ti _____ 65.3
C _____ 11.6
Fe _____ 2.10
Al _____ 0.90
Mn _____ 0.64
Si _____ 0.50
Mg _____ 0.43
Ca _____ 0.27
Nb _____ 0.22
Cr _____ 0.12
V _____ 0.10
Zr _____ 0.11
$H_2O$ _____ 0.04
Cl _____ 0.003
N _____ 0.42
O _____ 17.24

Composition:
TiC _____ 57.80
TiN _____ 1.86
$H_2O$ _____ 0.04
$MgO \cdot 2TiO_2$ _____ 3.55
Titanium oxide _____ 26.70 (computed as $TiO_2$)
$Al_2O_3 \cdot SiO_2$ _____ 2.74
FeO _____ 2.70
MnO _____ 0.83
$SiO_2$ _____ 0.05
$ZrO_2$ _____ 0.20
$V_2O_5$ _____ 0.20
$Cr_2O_3$ _____ 0.17
$Nb_2O_5$ _____ 0.31
Trace metal oxides _____ 2.85

The carbide solids in suspension were about 14 percent by weight in excess of the quantity representing a stoichiometric titanium value with respect to the chloride content of the suspension.

The velocity of the suspension fed to the reactor was about 7 millimeters per minute and, upon entering the reactor, a self-sustaining reaction flame resulted, thereby obviating the need for any further external heating of the ---
[1] Carbothermically-reduced Florida ilmenite.

reactor tube. Throughout a four-hour run in which 350 grams of carbide material in a chlorine gas suspension (ratio given above) was fed to the reactor and 6300 grams of $TiCl_4$ recovered, the flame temperature was about 700° C. and the stream of resulting reaction products withdrawn from the flame or zone of reaction substantially as formed and without significantly diminishing the velocity of the stream. Seventy percent conversion to $TiCl_4$ of the total titanium value in the carbide material resulted. The $TiCl_4$ was recovered by totally condensing the reaction products and separating $TiCl_4$ therefrom.

While the reactor tube in the above example was mounted horizontally, very good results were achieved by installing the reactor tube in a vertical position with an ash-accumulation pot at the bottom.

It is obvious that the reaction conditions given above are not intended to impose any undue restrictions upon the instant discovery, since the skilled chemical engineer will readily appreciate the numerous modifications to which the present invention lends itself.

For example, while the feed velocity in the above example is recited as 7 millimeters per minute, higher velocities would be suitable when using larger reactors. The velocity should be such, however, that a minimum of entrained unreacted solids appear in the gaseous reaction products existing from the reaction zone of flame. This is not to say, however, that the process is not adaptable to the selective chlorination of certain metals in metal-bearing materials. Clearly, by regulating the temperatures such that one or more of the metals in a metal-bearing material, such as an ore, are selectively chlorinated, the remaining metal or metals are necessarily entrained in the effluent gases as unreacted constituents. This is a very desirable feature of the present invention.

Numerous methods of feeding the reactants to the reactor are also contemplated herein. One particularly effective method comprises introducing chlorinatable metal-bearing particulates into a moving stream of chlorine and passing the resulting gas-solids suspension into the reaction zone.

A still further method of mixing the reactants comprises establishing separate streams of the gas and the solids, respectively, and impinging the streams in the reaction zone or slightly upstream therefrom.

Preheating of pre-mixed reactants is contemplated herein, even to the point of incipient reaction if desired. If separate streams are fed to the reaction zone, each of these tributaries may be separately preheated.

Stoichiometric quantities of reactants, and lesser or greater quantities, are suitable. When using stoichiometric quantities (based on the titanium value) of titanium carbide and chlorine, for example, temperatures on the order of about 1000° C. are created in the reaction zone. In such a case, a highly heat-resistant reactor furnace is required. Since the reaction is thermally self-sustaining, a very effective process for chlorinating metal-bearing materials is thus provided.

While the example given above teaches the use of titanium carbide material having a mesh size of 200 or smaller, it is understood that larger particulates on the order of 250 microns or even larger are contemplated. On the other hand, particulates having an average particle size of 5 microns or less are also suitable. Generally, however, finely-divided, metal-bearing materials having an average particle size between 20 and 120 microns are desirable.

When a chlorine suspension containing a metal-bearing material, such as rutile, and a carbonaceous reducing agent, such as carbon, in solid form is reacted as hereinabove described, it is desirable to use at least a stoichiometric quantity of carbon, calculated on the basis of the $CO_2$ theoretically producible when a given quantity of $TiO_2$, for example, is present in the reactant. To insure a sufficient amount of carbon, it is preferable to compute the carbon oxide as predominantly CO instead of $CO_2$. Thus, a rutile ore-carbon mixture comprising 80 percent ore by weight and 20 percent carbon by weight is suitable.

The particle size of the carbonaceous reducing solid generally closely parallels that of the metal-bearing material, although slightly larger particulate sizes are suitable.

The chlorinated reaction products of the present invention have many uses. First of all, they may be converted to pure metals, they may be oxidized to their corresponding oxides, such as by the conversion of $TiCl_4$ to $TiO_2$, a very useful pigment, etc.

While the present invention has been described in detail with respect to certain specific embodiments thereof, these details are not intended to place any undue restrictions on the invention, except insofar as they appear in the claim.

What is claimed is:

In the exothermic chlorination of metal bearing materials comprising titanium carbide by reaction of chlorine with said metal bearing materials, the improvement which comprises establishing a stream of particles of said material suspended in gaseous chlorine, projecting the stream into a central area of a reaction chamber having a cross-sectional area larger than that of the stream, igniting the stream and thereby producing a flame in which the chlorine reacts with the material, the temperature of the flame being sufficiently high to sustain the chlorination and to produce a resulting gaseous reaction product stream comprising titanium tetrachloride and maintaining said flame spaced from the walls of said chamber.

References Cited in the file of this patent
UNITED STATES PATENTS

| | | |
|---|---|---|
| 1,179,394 | Barton | Apr. 18, 1916 |
| 1,867,672 | McAfee | July 19, 1932 |
| 1,876,084 | Staib | Sept. 6, 1932 |
| 1,876,085 | Staib | Sept. 6, 1932 |
| 2,020,431 | Osborne et al. | Nov. 12, 1935 |
| 2,784,058 | Hair | Mar. 5, 1957 |
| 2,868,622 | Bennett et al. | Jan. 13, 1959 |

FOREIGN PATENTS

| | | |
|---|---|---|
| 141,908 | Great Britain | Apr. 29, 1920 |

OTHER REFERENCES

Roscoe and Schorlemmer: "A Treatise on Chemistry," vol. II, New Edition (1907), p. 613, published by MacMillan and Co. Ltd., London, England.

Chemical Engineering, vol. 64 No. 9, pp. 170–171 (September 1957).